(12) United States Patent
Reynolds

(10) Patent No.: US 10,029,597 B2
(45) Date of Patent: Jul. 24, 2018

(54) LIGHTWEIGHT CONTAINER

(71) Applicant: MIS.Carbonart Pty Ltd, Perth, Western Australia (AU)

(72) Inventor: Grant Christopher Reynolds, Perth (AU)

(73) Assignee: MIS.CARBONART PTY LTD, Perth (AU)

( * ) Notice: Subject to any disclaimer, the term of this patent is extended or adjusted under 35 U.S.C. 154(b) by 0 days.

(21) Appl. No.: 15/105,188

(22) PCT Filed: Dec. 16, 2014

(86) PCT No.: PCT/AU2014/001128
§ 371 (c)(1),
(2) Date: Jun. 16, 2016

(87) PCT Pub. No.: WO2015/089550
PCT Pub. Date: Jun. 25, 2015

(65) Prior Publication Data
US 2016/0311611 A1    Oct. 27, 2016

(30) Foreign Application Priority Data

Dec. 16, 2013 (AU) .................. 2013904911
Dec. 20, 2013 (AU) .................. 2013905020
Jan. 31, 2014 (AU) .................. 2014900295

(51) Int. Cl.
*B60P 1/28* (2006.01)
*B62D 33/04* (2006.01)
(Continued)

(52) U.S. Cl.
CPC ............... *B60P 1/286* (2013.01); *B61D 9/06* (2013.01); *B62D 33/02* (2013.01); *B62D 33/04* (2013.01);
(Continued)

(58) Field of Classification Search
CPC .. B60P 1/28; B60P 1/286; B60P 3/246; B61D 9/06; B61D 9/08; B62D 33/02; B62D 33/04; B65D 88/123
(Continued)

(56) References Cited

U.S. PATENT DOCUMENTS 7,530,627 B2 * 5/2009 Brennan .................. B60P 1/26
296/182.1
7,845,511 B1 * 12/2010 Strickland ............ B65D 88/123
220/1.6
(Continued)

FOREIGN PATENT DOCUMENTS

EP    1690810 A2 *  8/2006    ........... B65D 88/123
GB     914720 A     1/1963

OTHER PUBLICATIONS

English translation of EP 1690810A2; Retrieved via PatentTranslate located at www.epo.gov. (Year: 2006).*

Primary Examiner — Jason S Daniels
(74) Attorney, Agent, or Firm — Loza & Loza, LLP; Heidi Eisenhut

(57) ABSTRACT

The present invention relates to a container assembly comprising a container, and a load bearing exoskeleton for the container, the exoskeleton comprising a space frame construction. Also disclosed are a vehicle trailer, a rail wagon, and dump body for a dump truck comprising the container assembly.

18 Claims, 11 Drawing Sheets

(51) Int. Cl.
    *B65D 88/12*     (2006.01)
    *B65D 90/00*     (2006.01)
    *B62D 33/02*     (2006.01)
    *B61D 9/06*     (2006.01)

(52) U.S. Cl.
    CPC ....... *B65D 88/123* (2013.01); *B65D 90/0066* (2013.01)

(58) Field of Classification Search
    USPC ............................... 296/183.1, 183.2, 186.2
    See application file for complete search history.

(56) References Cited

U.S. PATENT DOCUMENTS

| | | |
|---|---|---|
| 7,997,213 B1 | 8/2011 | Gauthier et al. |
| 2006/0118504 A1 | 6/2006 | Willemsen |
| 2010/0264137 A1 | 10/2010 | Lampe |
| 2017/0144830 A1* | 5/2017 | Chalmers ............. B65D 88/123 |

\* cited by examiner

LIGHTWEIGHT CONTAINER

PRIORITY DOCUMENTS

The present application claims priority from:

Australian Provisional Patent Application No 2013904911 titled "A RAIL ORE WAGON OF COMPOSITE CONSTRUCTION" filed on 16 Dec. 2013;

Australian Provisional Patent Application No 2013905020 titled "A COMPOSITE EXOSKELETON OR SUPPORT FRAME WITH DURABLE LINING" and filed on 20 Dec. 2013; and Australian Provisional Patent Application No 2014900295 titled "A LIGHTWEIGHT CONTAINER" and filed on 31 Jan. 2014, the content of each of which is hereby incorporated by reference in its entirety.

TECHNICAL FIELD

The present invention relates to a container for transporting bulk materials, be this in its own right, or by forming part of vehicle, trailer or rail wagon. It will be appreciated however that its application is not so limited.

BACKGROUND

The greater the tare (or unladen) weight of a vehicle, trailer or rail wagon, the greater the cost of transporting goods via that vehicle, trailer or rail wagon. These costs may include fuel costs, and weight dependent taxes and tolls.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect of the invention, there is provided a container assembly comprising a container and a load bearing exoskeleton for the container, the exoskeleton comprising a space frame construction.

For the purpose of this specification, the term 'exoskeleton' means an external framework or structure.

In one form, the space frame comprises a plurality of struts arranged into a plurality of trusses and connected at points of intersection (or nodes) by strut joiners. For the purpose of this specification, the term 'strut' should be considered to encompass members suitable for loading in either of compression or tension.

In one form, each of the struts is tubular.

In one form, for each of the struts joined by a joiner, the joiner comprises a socket for receiving a strut end.

In one form, each of the struts is made of a material of high specific strength (strength to weight ratio).

In one form, each of the struts is made from a composite material.

In one form, each of the strut joiners is made from a composite material.

In one form, the composite material is a fibre-reinforced polymer.

In one form, the polymer is a thermoset resin. In one form the thermoset resin is an epoxy resin. In one form, in an alternative, the polymer is a thermoplastic polymer.

In one form, the fibres are carbon fibres. In one form, in an alternative, the fibres are one of aramid, aluminium or glass fibres.

In one form, in an alternative, each of the struts is made of a metal.

In one form, in an alternative, each of the strut joiners is made of a metal.

In one form, for each peripheral edge of the container the exoskeleton provides an adjacent load bearing strut.

In one form, the container is secured to the exoskeleton by a plurality of attachment brackets.

In one form, the container is comprised of a plurality of panels.

In one form, each panel comprises at least one attachment flange. In one form, each edge of a panel comprises an attachment flange.

In one form, each attachment flange for a panel is secured to a strut provided in a position adjacent to the flange by one or more of the attachment brackets.

In one form, the container is a bin comprising an uppermost opening.

In one form, in an alternative, the container is a tank.

In one form, the container assembly is constructed with the overall dimensions of an intermodal (or ISO/shipping) container. Moreover, in one form, the container assembly is constructed with intermodal container type attachment and handling points at its corners. In one form, these attachment and handling points would depend from the frame. In this way, the container assembly of the present invention can be lifted and upended by a 'tippler' type container handler.

According to a further aspect of the invention, there is provided a vehicle trailer comprising the container assembly of the above described type, and at least one wheeled assembly depending from the load bearing exoskeleton.

According to a further aspect of the invention, there is provided a rail wagon comprising the container assembly of the above described type, and a pair of rail bogies depending from the load bearing exoskeleton.

In one form, the rail wagon is an open wagon for bulk goods.

According to a further aspect of the invention, there is provided a dump body for a dump truck, the dump body comprising the container assembly of the above described type adapted for pivotal attachment to a chassis of the dump truck.

According to a further aspect of the invention, there is provided a dump truck comprising a dump body comprising the container assembly of the above described type.

In one form, the dump truck is a haul truck.

According to a further aspect, there is provided a load bearing exoskeleton for a container, the exoskeleton comprising a space frame construction.

According to a further aspect, there is provided a load bearing exoskeleton for a container, wherein the exoskeleton is made from a composite material.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

In order to further understand the invention, preferred embodiments, will now be described. However, it will be realised that the scope of the invention is not be confined or restricted to the details of the embodiments described below. Variations and alterations that would be readily apparent to a person skilled in the art are deemed as being incorporated within the scope of the invention.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
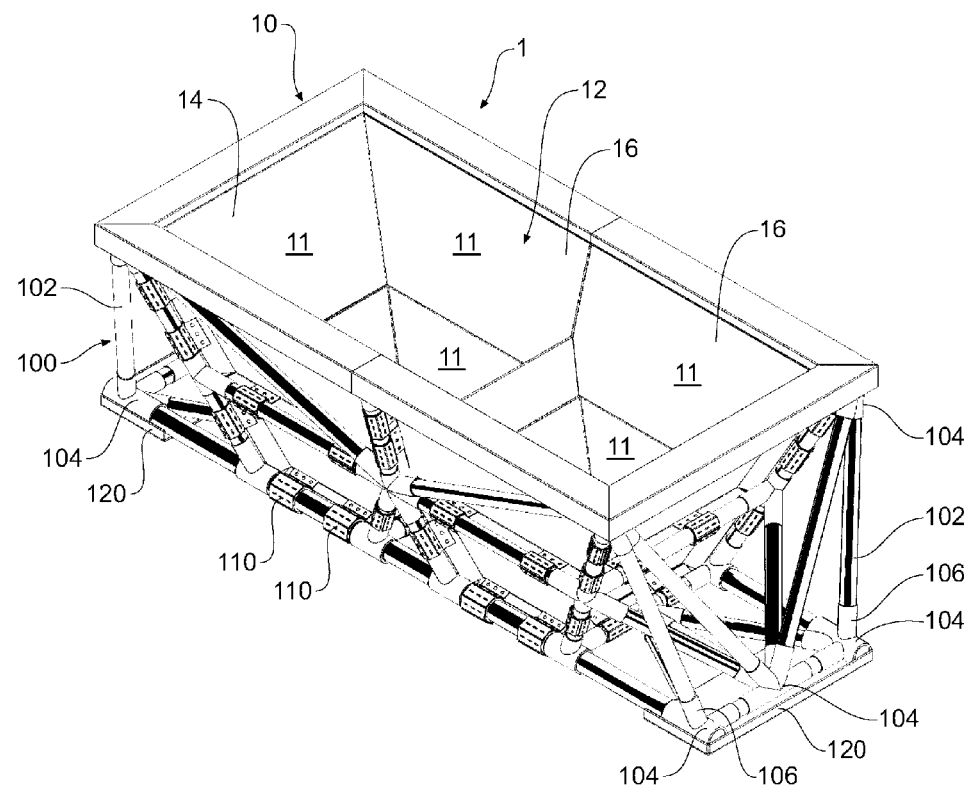
FIG. 1 is an isometric view of a container assembly.
Figure 2:
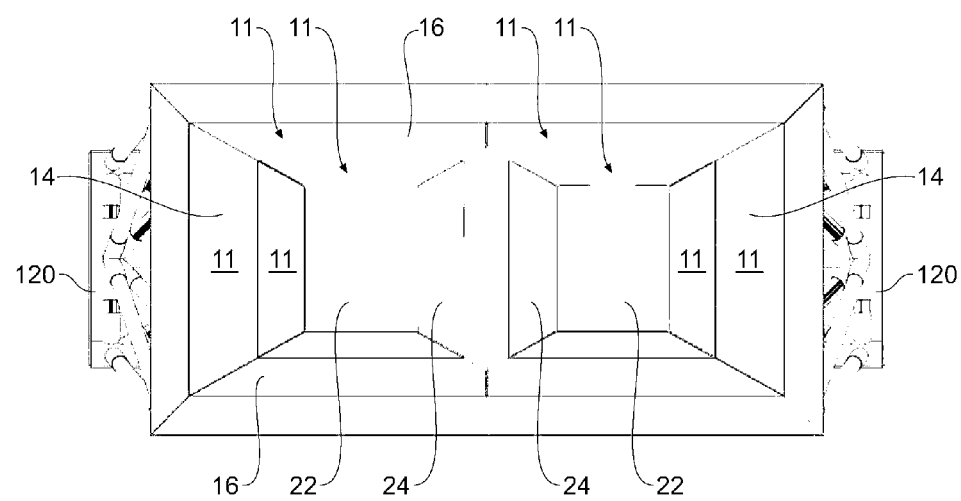
FIG. 2 is a plan view of the container assembly of FIG. 1.
Figure 3:
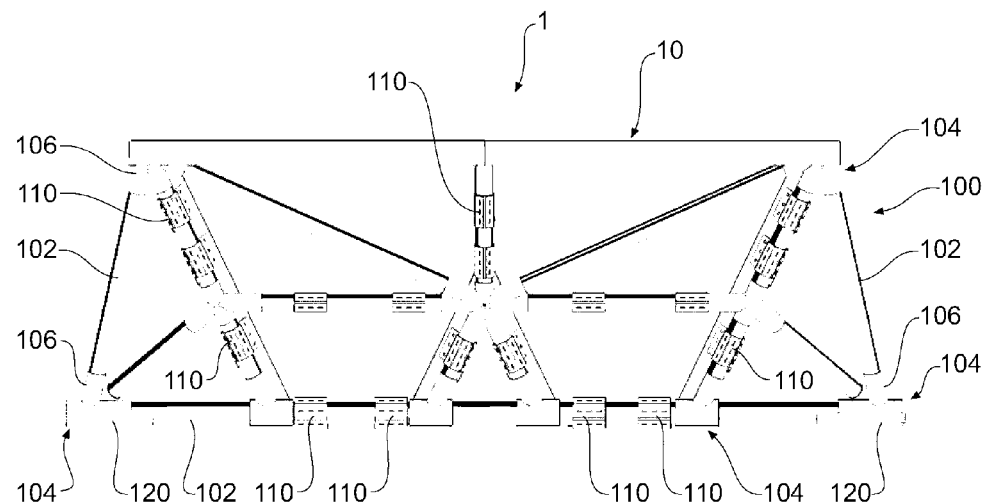
FIG. 3 is a side view of the container assembly of FIG. 1.
Figure 4:
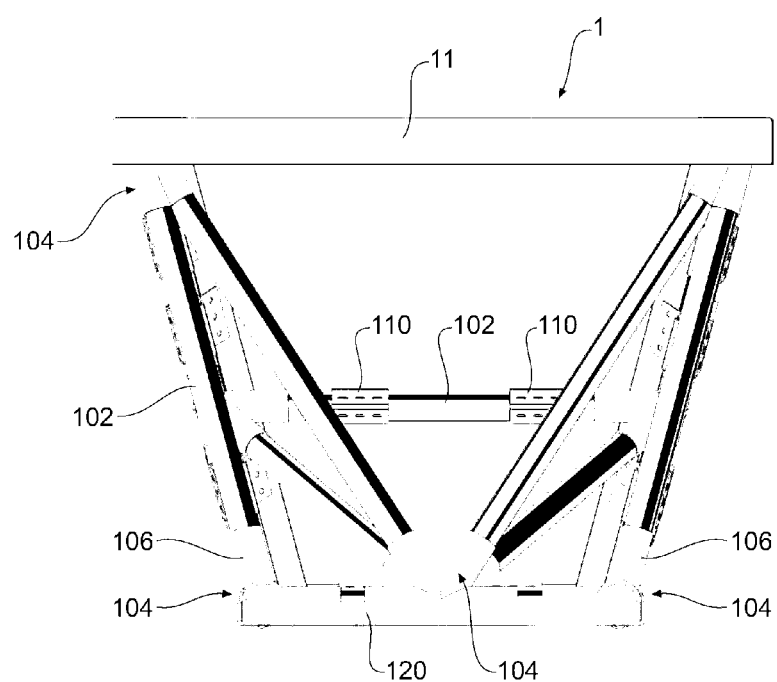
FIG. 4 is an end view of the container assembly of FIG. 1.

Referring now to FIGS. 1 through 4, where there is shown a container assembly 1 comprising a container in the form of a bin (or liner) 10 comprising an uppermost opening 12, and a load bearing exoskeleton 100 for the container 10, the exoskeleton 100 comprising a space frame construction.

The container 10 is constructed of sheet metal (preferably stainless steel), although its construction is not necessarily so limited so long as the bin material is sufficiently durable and wear resistant. The upper most opening 12 to the bin 10 is rectilinear, so the bin 10 comprises a pair of opposing end walls 14 and a pair of opposing side walls 16. The bin comprises two compartments 20 of a hopper-like shape, so that the walls of each compartment converge towards a compartment floor 22, where the floor 22 for each compartment 20 is separated by a pair of divider walls 24.

The space frame of the exoskeleton 100 comprises a plurality of carbon fibre tubular struts 102 arranged into a plurality of trusses, and joined at points of intersection (or nodes) by carbon fibre strut joiners 104.

For each of the struts 102 joined by a joiner 104, the joiner 104 comprises a socket 106 for receiving a strut 102 end. For example, that is to say, that a joiner 104 for joining five struts 102, such as can be found at each of the corners of the opening 12 to the bin, will comprise five sockets 106.

Figure 5:
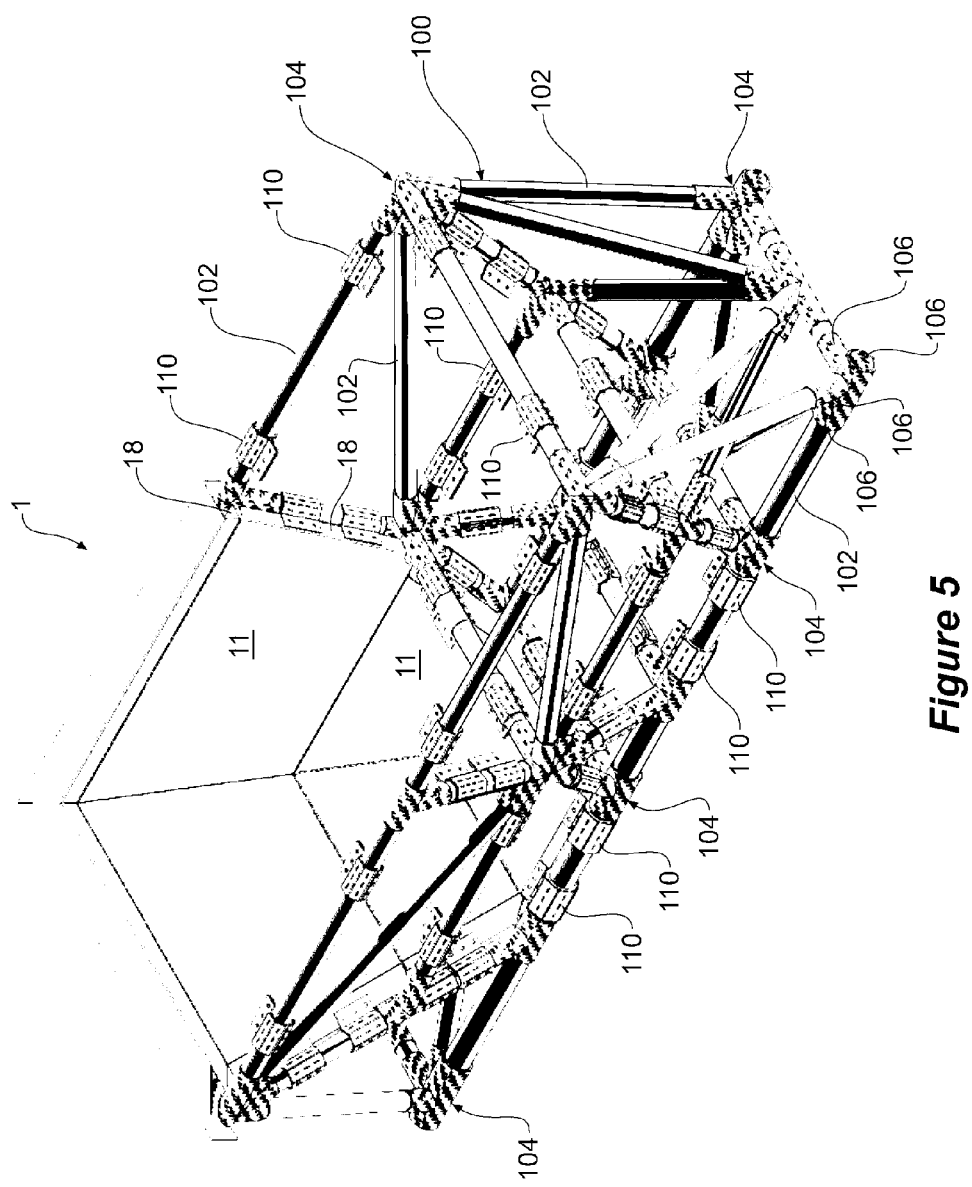
FIG. 5 is an isometric view of the container assembly of FIG. 1 wherein select bin panels have been removed to permit visibility of the exoskeleton.
Figure 6:
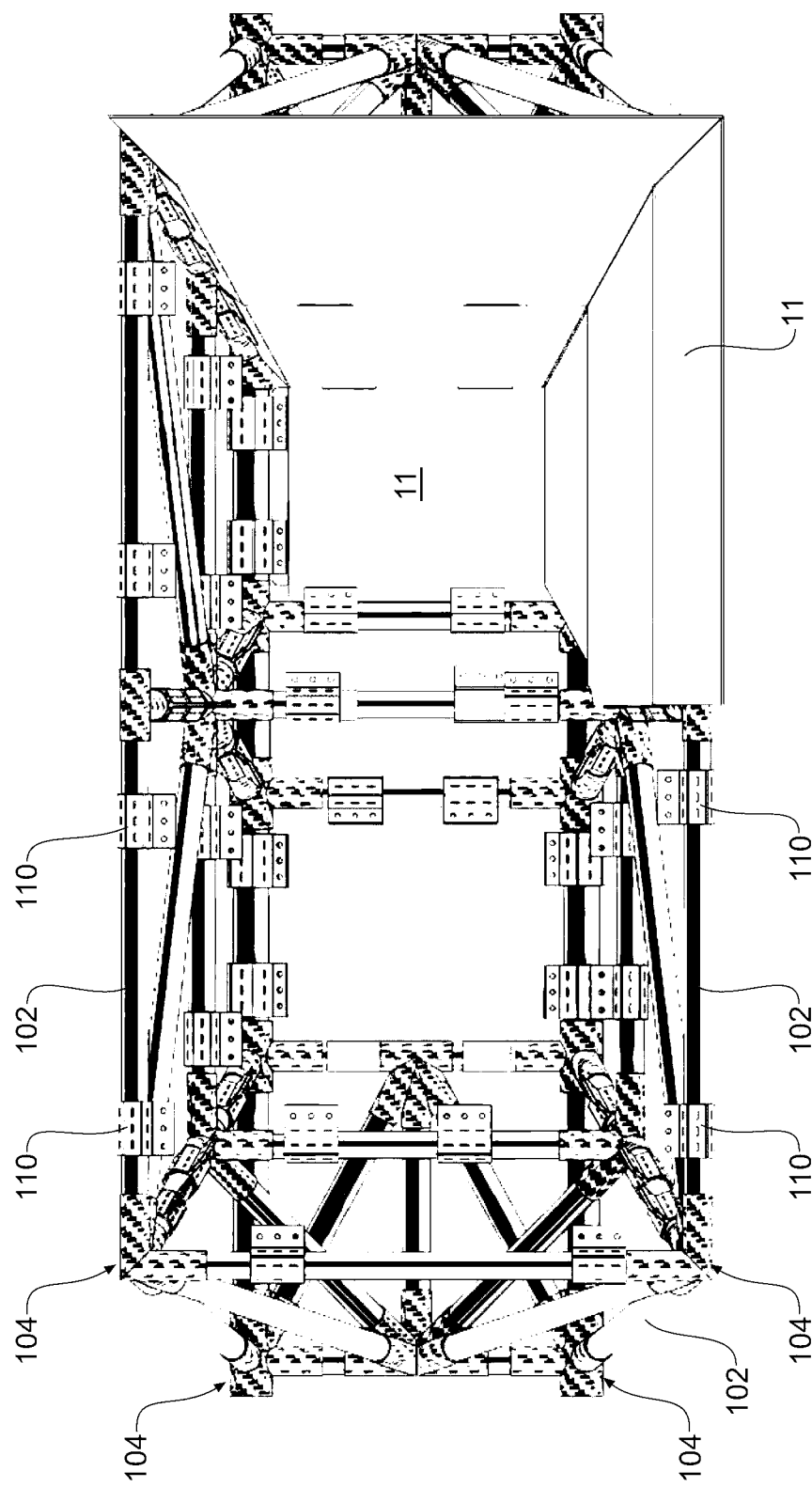
FIG. 6 is a plan view of the incomplete container assembly of FIG. 5.
Figure 7:
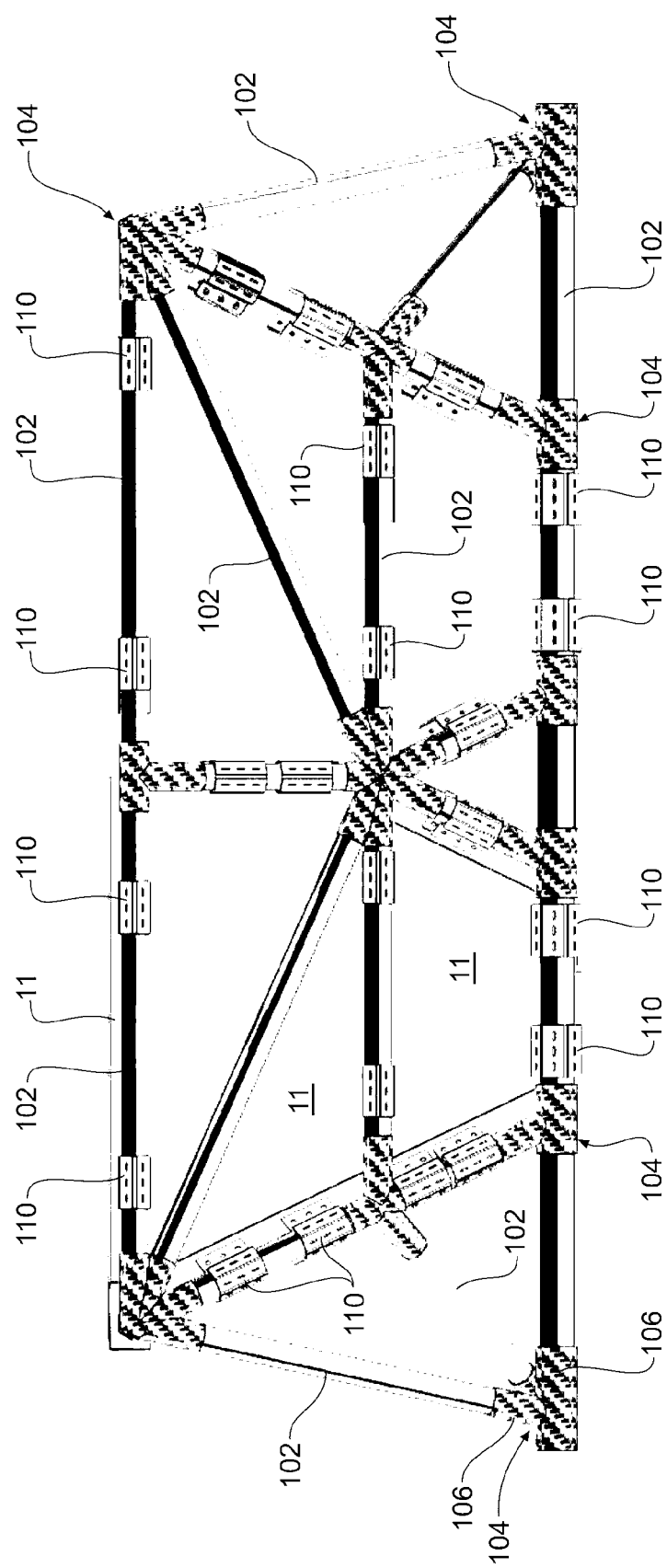
FIG. 7 is a side view of the incomplete container assembly of FIG. 5.
Figure 8:
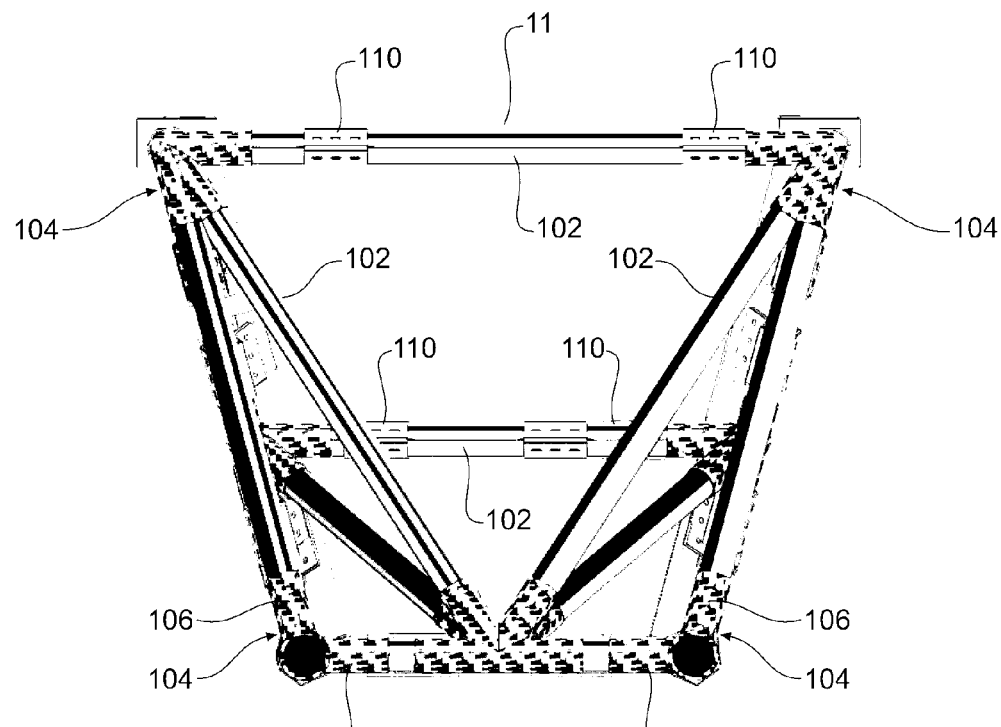
FIG. 8 is an end view of the incomplete container assembly of FIG. 1.
Figure 9:
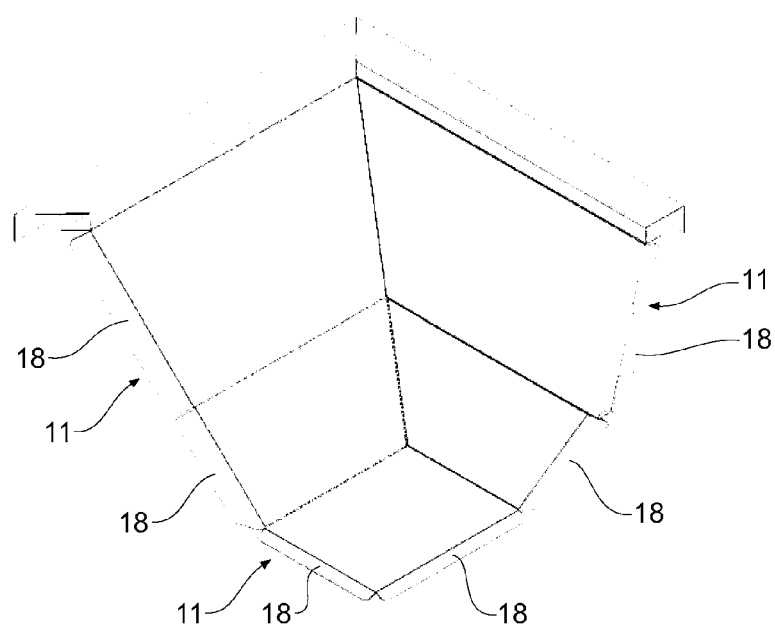
FIG. 9 is an isometric view of a wall panel from the container assembly of FIG. 5, in isolation.
Figure 10:
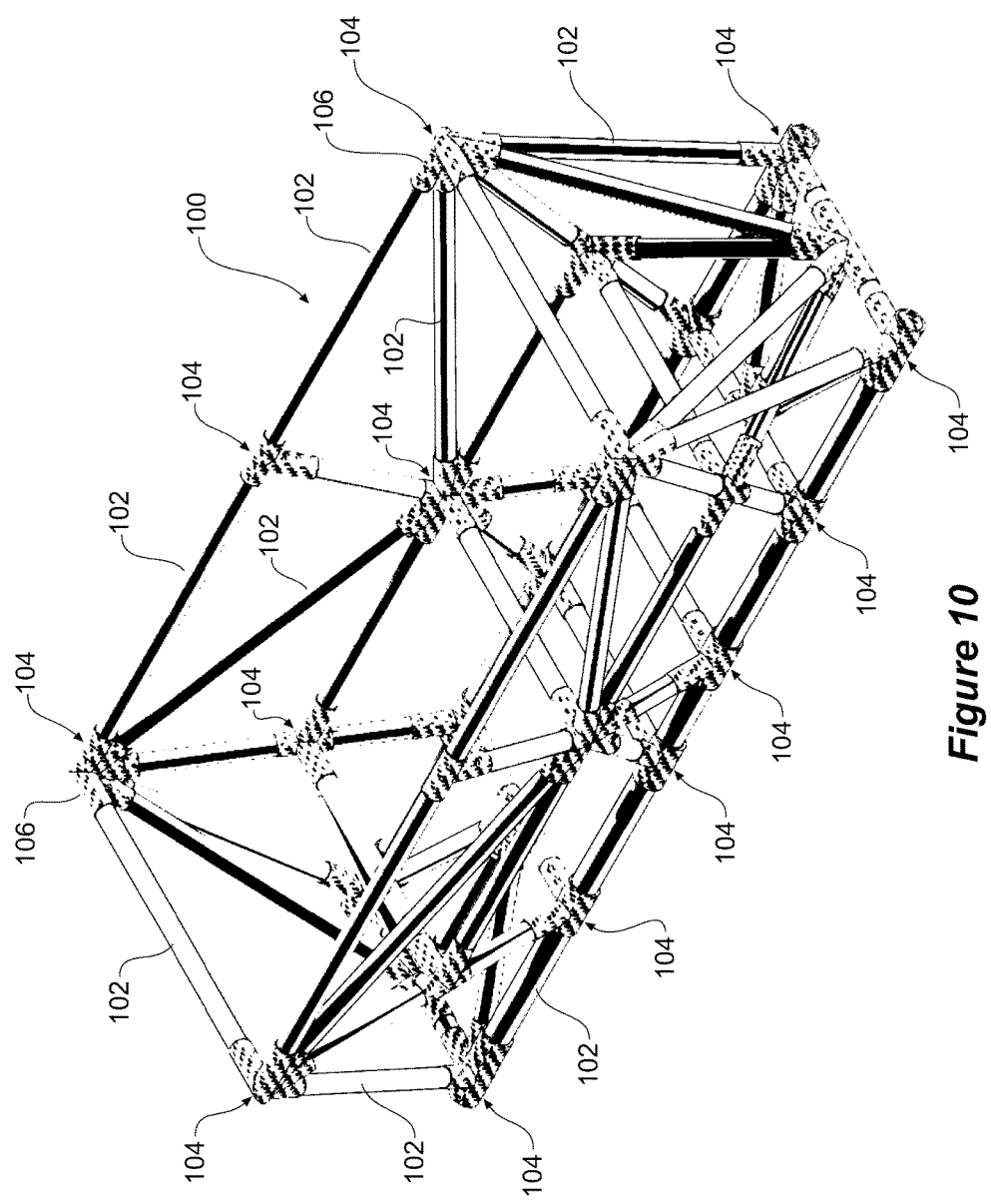
FIG. 10 is an isometric view of an exoskeleton from the container assembly of FIG. 5, in isolation.
Figure 11:
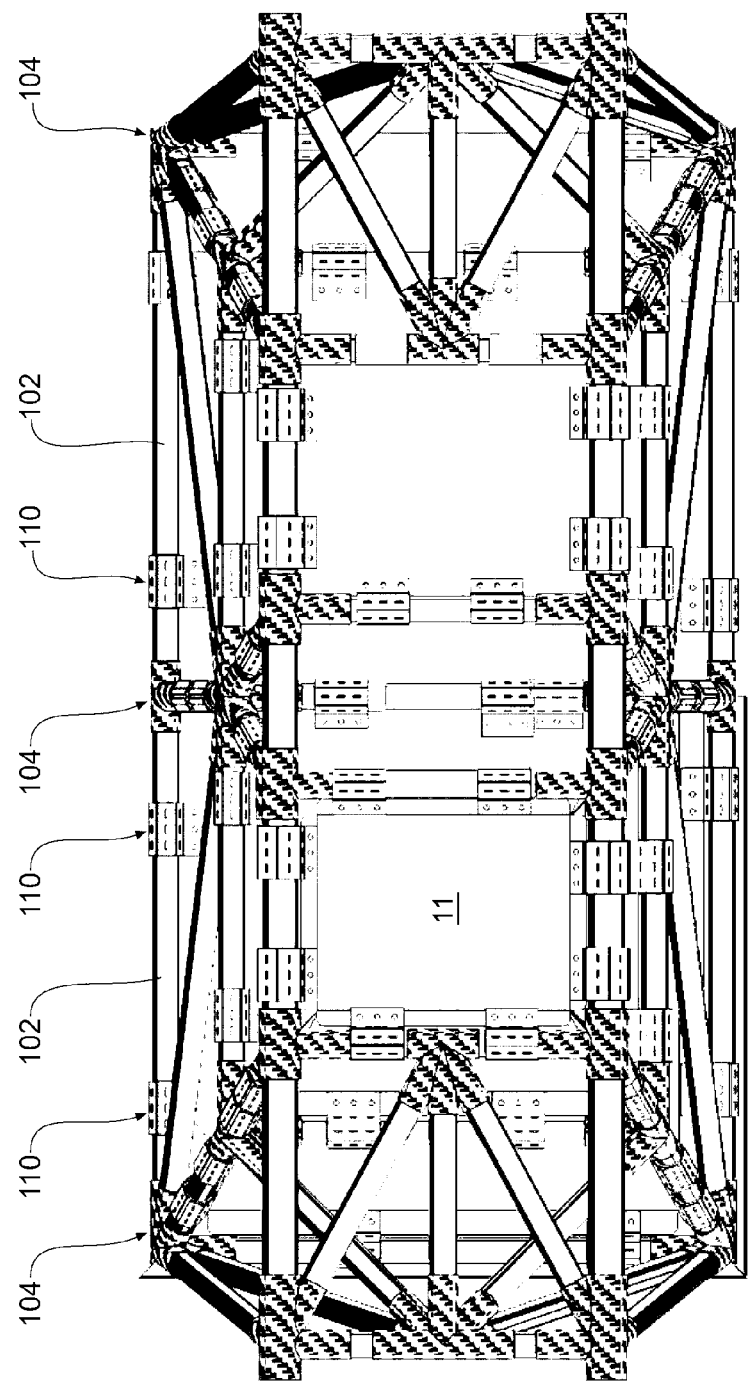
FIG. 11 is an underside view of the exoskeleton of FIG. 10.

With reference to FIGS. 5 through 7, it can be seen how each of the walls and the floors of the bin 10 is comprised of one or more sheet metal panels 11. With reference to FIG. 9, it can be seen how each of these panels 11 is formed with a flange 18 extending lengthwise along each of its edges. The significance of these flanges 18 will become apparent from the description which follows.

Figure 12:
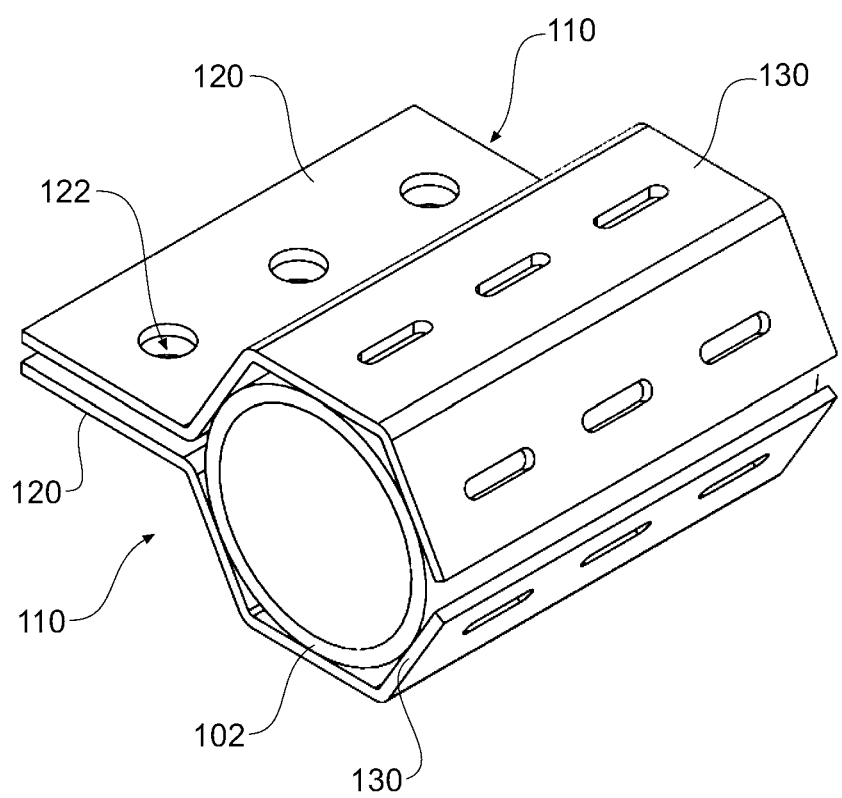
FIG. 12 is a detail view of an attachment bracket for securing the wall panel of FIG. 9, to the exoskeleton of FIG. 10.
Figure 13:
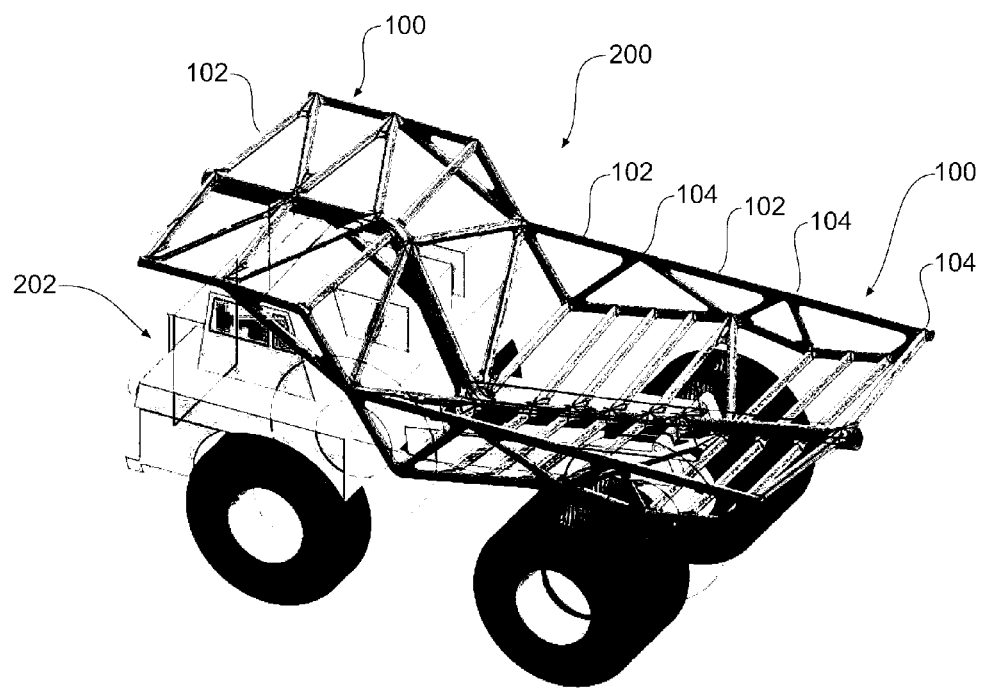
FIG. 13 is a perspective view of a dump truck comprising a dump body constructed in accordance with the present invention.
Figure 14:
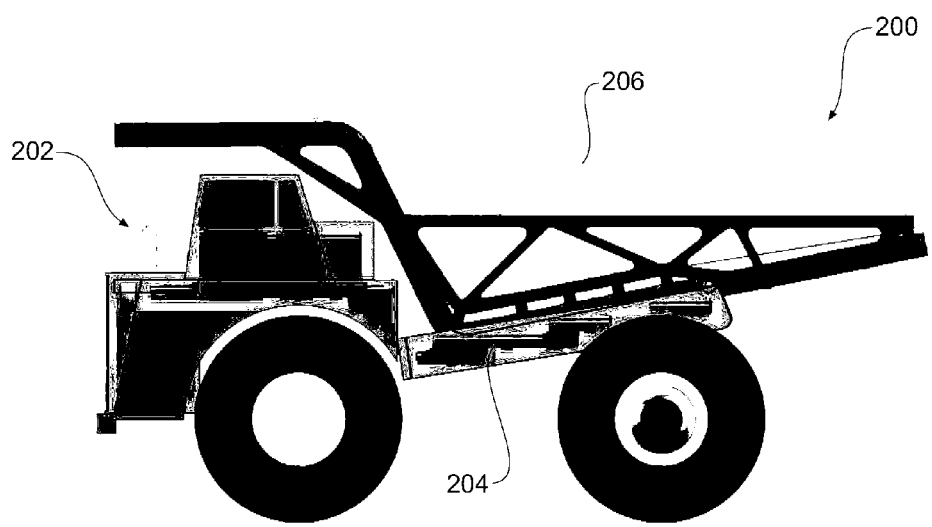
FIG. 14 is a side view of the dump truck of FIG. 13.
Figure 15:
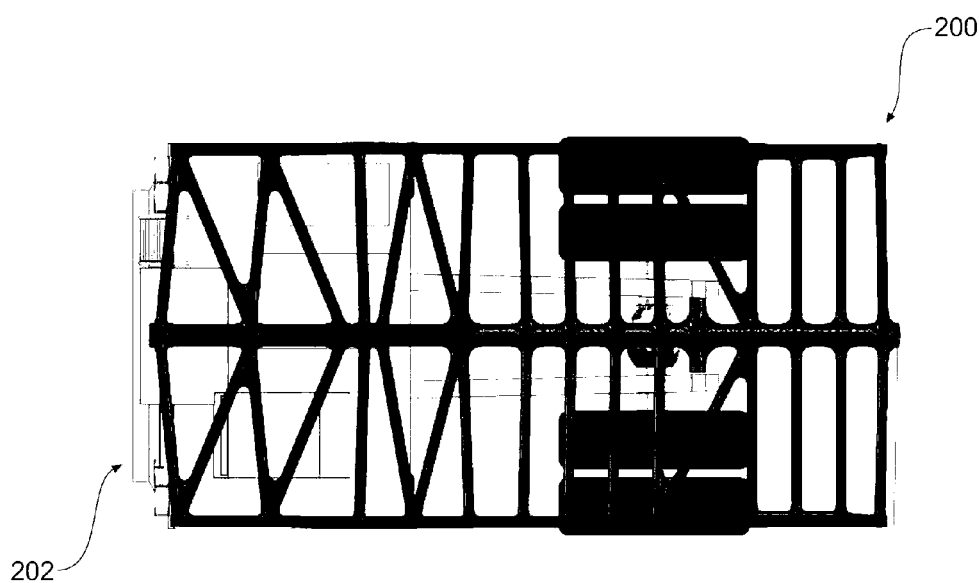
FIG. 15 is plan view of the dump truck of FIG. 13.
Figures 16, 17:
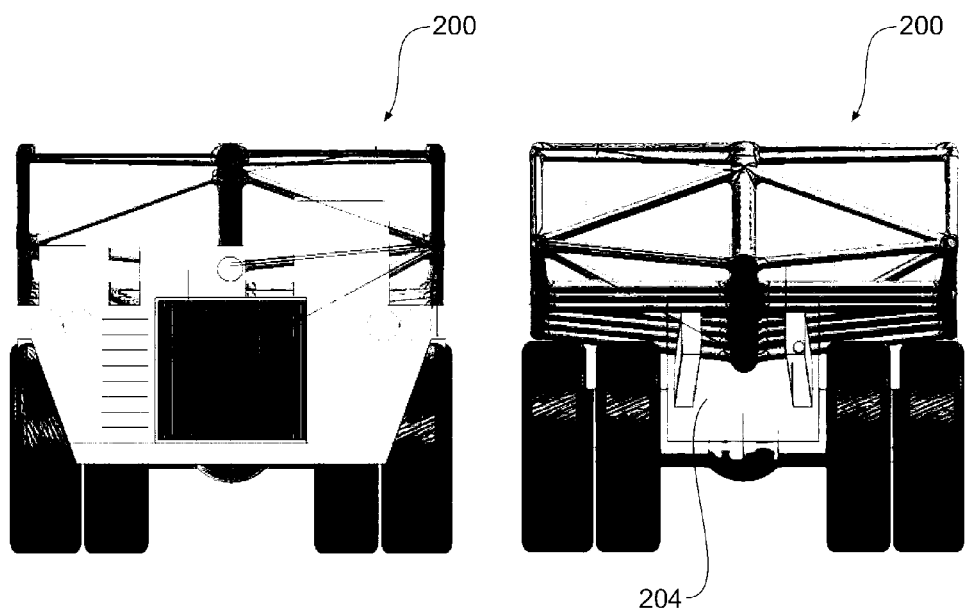
FIG. 16 is a front view of the dump truck of FIG. 15.
FIG. 17 is a rear view of the dump truck of FIG. 13.

The bin 10 is secured to the exoskeleton 100 using a plurality of steel attachment brackets 110. With reference to FIG. 12, it can be seen how each of the brackets 110 comprises a flange 120 via which the bracket 110 is secured to a panel flange 18, and a half-collar 130 via which the bracket 110 is secured to a strut 102 of the exoskeleton 100. In use, these attachment brackets 110 are employed in pairs arranged so that the half-collars 130 cooperatively form a collar which clamps around a strut 102, and one or more panel flanges 18 are sandwiched between the flanges 120 and clamped together by bolting (or the like) through holes 122. An advantage of supporting the bin 10 panels 11 in this way is that they can be readily replaced if damaged, or otherwise worn to the point that they are no longer fit for service.

By virtue of the use of lightweight materials, and also its design and its geometry, the exoskeleton 100 is lightweight, but it is also very strong and rigid in spite of its light weight. The bin 10 too is lightweight, but not in and of itself sufficiently strong or rigid for its intended purpose. However, by virtue of the fact that the bin 10 is fully supported by the exoskeleton 100, the exoskeleton 100 gives strength and rigidity to the bin 10. The bin 10 fully supports the exoskeleton 100 by providing for each peripheral edge of the bin 10 an adjacent load bearing strut 102, along with intermediate struts 102 for both bracing the exoskeleton 100 and supporting the bin 10 in regions between the peripheral struts 102.

The exoskeleton 100 is so strong that container assembly 1 can form the basis of either a trailer or a rail wagon without requiring the support of a separate chassis. That is to say, in addition to fully supporting the loaded bin 10, the exoskeleton can also serve as a chassis, so that one or more bogies, axles or wheels can depend from the underside of the exoskeleton 100. To form a rail wagon, the container assembly 1 is retrofitted with a rail bogie at each end. It is estimated that a rail wagon constructed in this way will be as much as 40% lighter than any current equivalent. This means that a given locomotive can haul 40% material when this material is carried in the rail wagons according to the present invention.

To form a semi-trailer, the container assembly 1 is retrofitted with a road bogie at one end, and a king-pin for a fifth wheel coupling at the other end.

With reference to any one FIGS. 1 through 4, where any one of a bogie, axle or king pin is to be secured to the exoskeleton 100, this can be secured to an attachment tray 120.

The present invention should not be considered limited to a bin 10 of the shape and proportions illustrated however. Instead, the shape of both the bin and its exoskeleton may be customised to suit the characteristics of the bulk material the container assembly is intended to carry. Moreover, a wider and shallower container assembly 1 could serve as a dump body of a dump (or tip) truck.

Further possible options include one or more of a lid for the container opening and/or doors lowermost in the bin via which a load can be released.

Referring now to FIGS. 13 through 17, where there is illustrated a container assembly 200 according to a further embodiment of the present invention. Those parts of the container assembly 200 which are identical (or near-identical) to corresponding parts shown in the container assembly 1 of FIGS. 1 through 12, will be denoted by the same reference numerals and will not be described again in detail.

Container assembly 200 is a dump body for a haul truck 202, so it is pivotally attached to a chassis 204 of the haul truck 202 so that it can be tilted rearwardly by hydraulic rams. The container assembly 200 comprises a bin (or liner) 206 (see FIG. 14) comprising an uppermost opening 12, and a load bearing exoskeleton 100 for the bin 10, the exoskeleton 100 comprising a space frame construction of carbon fibre tubular struts 102 arranged into a plurality of trusses, and joined at points of intersection (or nodes) by carbon fibre strut joiners 104.

Liner 206 can be made either of stainless steel only, composite material and stainless steel, or composite material only.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

It will be apparent from all of the above, that the present invention provides a versatile, lightweight, and high strength container assembly.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A container assembly comprising:
a container, the container having an interior and an exterior and comprised of a plurality of contiguous rigid panels, the container assembly further comprising a rigid load bearing exoskeleton extending around the exterior of the container, the exoskeleton comprising a plurality of struts of fibre reinforced polymer joined by a plurality of joiners of fibre reinforced polymer to form a space frame construction.

2. The container assembly of claim 1, wherein the plurality of struts is connected at points of intersection by the plurality of strut joiners.

3. The container assembly of claim 1, wherein for each peripheral edge of the container, the exoskeleton provides an adjacent load bearing strut.

4. The container assembly of claim 1, wherein each of the struts is tubular.

5. The container assembly of claim 1, wherein each joiner comprises a socket for receiving a strut end.

6. The container assembly of claim 1, wherein the container is secured to the exoskeleton by a plurality of attachment brackets.

7. The container assembly of claim 1, wherein, each panel comprises at least one attachment flange.

8. The container assembly of claim 7, wherein each edge of the each panel comprises an attachment flange.

9. The container assembly of claim 7, wherein for each attachment flange of the container the exoskeleton provides an adjacent load bearing strut.

10. The container assembly of claim 9, wherein each attachment flange is secured to its adjacent load bearing strut by an attachment bracket.

11. The container of claim 1, wherein the container is a bin comprising an uppermost opening.

12. The container assembly of claim 11, further comprising a pivotal attachment for attaching the container assembly to a chassis of a dump truck.

13. A dump truck comprising the dump body of claim 12.

14. The container assembly of claim 1, further comprising at least one wheeled assembly depending from the load bearing exoskeleton.

15. The container assembly of claim 1, further comprising a pair of rail bogies depending from the load bearing exoskeleton.

16. A dump body for a dump truck, the dump body comprising a container comprised of a plurality of contiguous rigid panels, and comprising an interior, an exterior and an uppermost opening, the dump body further comprising a rigid load bearing exoskeleton extending around the exterior of the container, the exoskeleton comprising a plurality of struts of fibre reinforced polymer joined by a plurality of joiners of fibre reinforced polymer to form a space frame construction.

17. The dump body of claim 16, further comprising a pivotal attachment for attaching the dump body to a chassis of the dump truck.

18. The dump truck of claim 17, wherein the dump truck is a haul truck.

* * * * *